United States Patent
Liu et al.

(10) Patent No.: US 8,514,781 B2
(45) Date of Patent: Aug. 20, 2013

(54) APPARATUS AND METHOD FOR ADJUSTING TRANSMISSION POWER OF COMMUNICATION SYSTEM

(75) Inventors: Der-Zheng Liu, Hsinchu (TW); Kuang-Yu Yen, Hsinchu (TW); Jia-Ching Shen, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 460 days.

(21) Appl. No.: 12/836,486

(22) Filed: Jul. 14, 2010

(65) Prior Publication Data
US 2011/0013561 A1  Jan. 20, 2011

(30) Foreign Application Priority Data
Jul. 16, 2009 (TW) .............................. 98124167 A (51) Int. Cl.
*H04W 4/00* (2009.01)

(52) U.S. Cl.
USPC ............ 370/328; 370/329; 370/341; 370/340

(58) Field of Classification Search
None
See application file for complete search history.

(56) References Cited

U.S. PATENT DOCUMENTS

| | | | |
|---|---|---|---|
| 7,848,703 B1 * | 12/2010 | Beard et al. ................... | 455/41.2 |
| 2002/0172186 A1 * | 11/2002 | Larsson ......................... | 370/349 |
| 2003/0147415 A1 * | 8/2003 | Dore et al. ..................... | 370/445 |
| 2004/0166886 A1 * | 8/2004 | Laroia et al. ................... | 455/522 |
| 2007/0115180 A1 * | 5/2007 | Kish et al. ............. | 343/700 MS |
| 2007/0133459 A1 * | 6/2007 | Kim et al. ...................... | 370/329 |
| 2009/0109885 A1 * | 4/2009 | Fonseca et al. ................ | 370/311 |

FOREIGN PATENT DOCUMENTS
EP  1150463 A2  10/2001

OTHER PUBLICATIONS
CN Office Action (Dated Nov. 2, 2012).

* cited by examiner

*Primary Examiner* — Hassan Phillips
*Assistant Examiner* — Anez Ebrahim
(74) *Attorney, Agent, or Firm* — McClure, Qualey & Rodack (57) ABSTRACT

The present invention provides a method for adjusting transmission power of a communication system having a first terminal and a second terminal. In accordance with a preferred embodiment, the method comprises steps of: (a) repeatedly transmitting a detecting packet from the first terminal to the second terminal by sequentially using one of a variety of transmission powers; (b) receiving a responding packet from the second terminal, wherein the responding packet corresponds to the one of the variety of transmission powers; and (c) choosing at least one from the variety of the transmission powers for transmitting at least a data packet to the second terminal therewith based on the responding packet from the second terminal.

16 Claims, 7 Drawing Sheets

| TRY #1 | LPL | High speed |
|---|---|---|
| TRY #2 | MPL | High speed |
| TRY #3 | HPL | High speed |
| TRY #4 | HPL | High speed |
| TRY #5 | HPL | Medium speed |
| TRY #6 | HPL | Medium speed |
| TRY #7 | HPL | Low speed |

APPARATUS AND METHOD FOR ADJUSTING TRANSMISSION POWER OF COMMUNICATION SYSTEM

FIELD OF THE INVENTION

The present invention relates to a method for adjusting transmission power, and more particularly to a method for adjusting the transmission power in a wireless communication system.

BACKGROUND OF THE INVENTION

Wireless communication is the technology capable for performing data transmission between at least two terminals while doing without a wire, in the field of telecommunication. In the applications of wireless communication, a key issue is to effectively adjust the transmission power. When the two terminals are close to each other, reducing the transmission power may reduce the power consumption of the communication system as well as the interference to other wireless devices, which improves the compatibility among the wireless devices.

According to the current technologies for the adjustment of transmission power, the received signal strength indication (RSSI) at a terminal is used (i.e., based on the RSSI) for the estimation of distance index to perform adjustment to transmission power. However, if the two communication terminals is equipped with the mechanism of automatic transmission power adjustment, both of the terminals will not able to obtain a good estimation and result in misjudgment, for the two terminals are performing distance estimation and transmission power adjustment simultaneously. Accordingly, there is a need to improve such a drawback.

SUMMARY OF THE INVENTION

To overcome the abovementioned drawback, the present invention provides a method for adjusting transmission power of a communication system having a first terminal and a second terminal. In accordance with a preferred embodiment, the method comprises steps of: (a) repeatedly transmitting a detecting packet from the first terminal to the second terminal by sequentially using one of a variety of transmission powers; (b) receiving a responding packet from the second terminal, wherein the responding packet corresponds to the one of the variety of transmission powers; and (c) choosing at least one from the variety of the transmission powers for transmitting at least a data packet to the second terminal therewith based on the responding packet from the second terminal. Preferably, the first terminal performs a message transmission to the second terminal via a protocol, the protocol complies with an IEEE 802.11 standard, and the detecting packet is a request-to-send packet, and the responding packet is a clear-to-send packet.

Preferably, the method further comprises a step of obtaining a statistical value based on the responding packet from the second terminal and analyzing the statistical value to choose at least one from the variety of transmission powers for transmitting the at least one data packet to the second terminal.

Preferably, the method further comprises a step of transmitting a null data packet from the first terminal, after the step of receiving the responding packet from the second terminal.

Preferably, the method further comprises a step of repeating the step of repeatedly transmitting a detecting packet from the first terminal to the second terminal by sequentially using one of a variety of transmission powers after the step of receiving the responding packet from the second terminal.

In accordance with another aspect of the present invention, a method for adjusting transmission information of a communication system having a first terminal and a second terminal is provided. The method comprises steps of: (a) repeatedly transmitting a detecting packet from the first terminal to the second terminal based on a table containing plural groups of transmission information, each group of which includes at least on of a transmission power and a transmission rate; (b) receiving a responding packet from the second terminal, wherein the responding packet corresponds to one of the plural groups of transmission information; and (c) updating the table based on the responding packet from the second terminal.

Preferably, the abovementioned method further comprises a step of obtaining a statistical value based on the responding packet from the second terminal and analyzing the statistical value to update the table, wherein the first terminal performs a message transmission to the second terminal via a protocol complying with an IEEE 802.11 standard and the responding packet is an acknowledgement packet.

Preferably, the method further comprises a step of adjusting the transmission information in the table based on an auto-rate fallback mechanism.

In accordance with a further aspect of the present invention, a method for adjusting transmission power of a communication system having a first terminal and a second terminal is provided. The method comprises steps of (a) repeatedly transmitting a detecting packet from the first terminal to the second terminal by sequentially using one of a variety of transmission powers in a current time interval; (b) receiving a responding packet from the second terminal, wherein the responding packet corresponds to the one of the variety of transmission powers; and (c) choosing at least one from the variety of the transmission powers for a transmitting between the first and the second terminals in a next time interval based on the responding packet from the second terminal.

Preferably, the first terminal performs a message transmission to the second terminal via a protocol complying with an IEEE 802.11 standard.

Preferably, the detecting packet is a request-to-send packet comprising an address information of the second terminal, and the responding packet is a clear-to-send packet.

Preferably, the method further comprises a step of transmitting a data packet from the first terminal when the second terminal generates the responding packet in response to the first terminal.

Preferably, the method further comprises a step of obtaining a statistical value based on the responding packet from the second terminal, wherein the choosing at least one from the variety of transmission powers is based on the statistical value.

The present invention provides a method for adjusting the transmission powers between two terminals of a wireless communication system. The method embodies one of the terminals for repeating outputting the same detecting packet to the other terminal with different transmission power levels from low to high, the other terminal determines the appropriate transmission power based on an assessment to the received packet. Therefore, the misjudgment or incorrect estimation due to the two transmission terminals performing the adjustment simultaneously can be avoided. Besides, since the transmission power level used for outputting the detecting packet is selected from low to high, the selected transmission power will likely be the lowest available one and so as to lower the power consumption due to the wireless communication.

The above objects and advantages of the present invention will be more readily apparent to those ordinarily skilled in the art after reading the details set forth in the descriptions and drawings that follow, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1A:
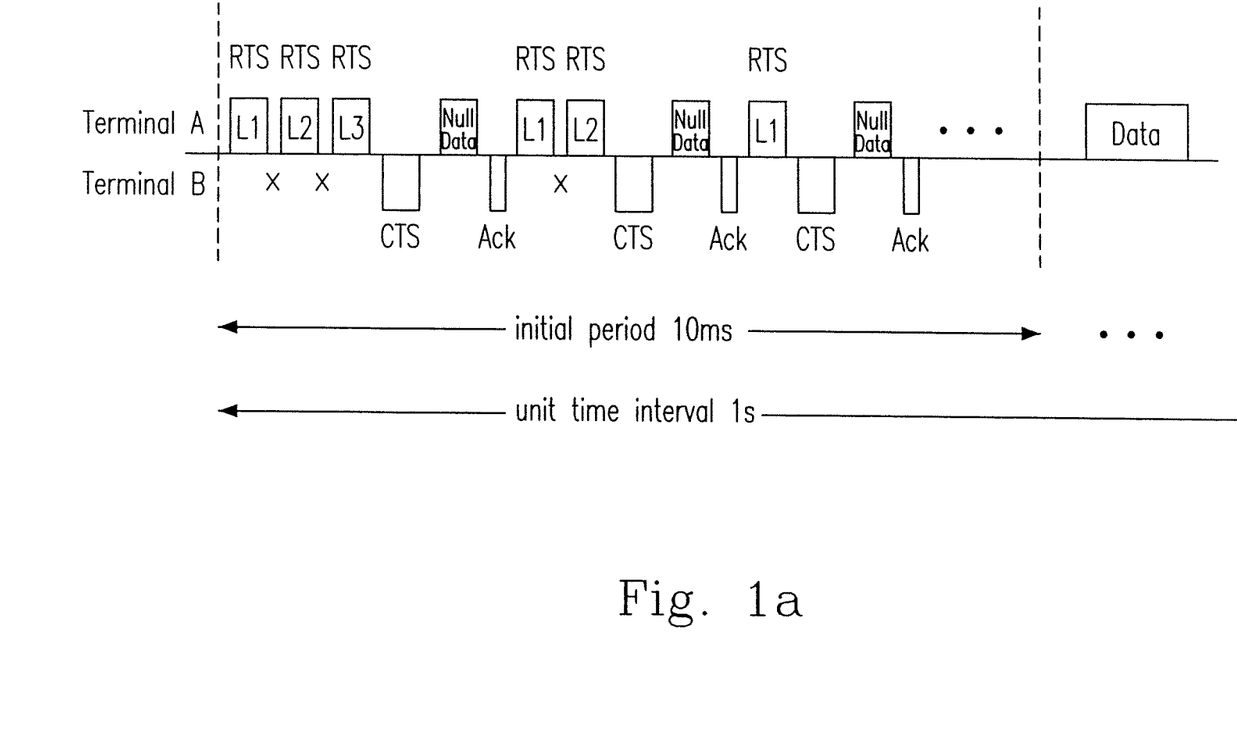
FIG. 1a is a schematic diagram of the signals transmitted between the two terminal for the first preferred embodiment according to the present invention.
Figure 1B:
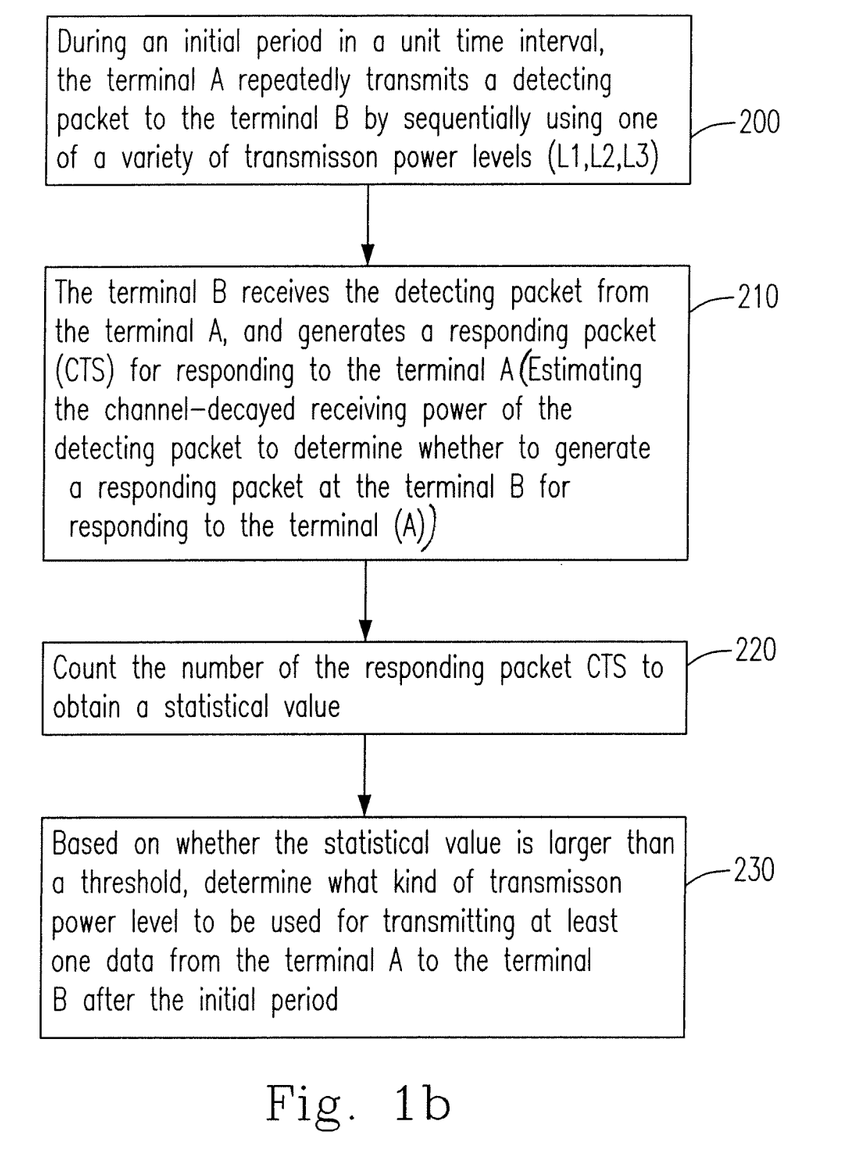
FIG. 1b is a flow chart of the first preferred embodiment according to the present invention.

Please refer to FIGS. 1a and 1b, which are a schematic diagram showing the signals transmitted between the two terminals and a flow chart of a first preferred embodiment of the present invention, respectively. FIG. 1a illustrates a terminal A and a terminal B in remote distance performing the adjustment of transmission power by a RTS/CTS mechanism via a wireless network protocol, such as IEEE802.11, during an initial period in a unit time interval. The mentioned RTS/CTS mechanism is that the terminal A submits a request-to-send (RTS) requesting packet prior to transmitting data to the terminal B, the terminal B reply to the terminal A with a clear-to-send (CTS) packet after receiving the RTS packet, and the CTS packet informs the terminal A that the terminal B is ready to receive the data, and informs the other wireless devices not to transmit any data, to avoid data collision.

There are a variety of transmission powers from terminal A to terminal B. The variety of transmission powers are categorized in three (3) levels, which are a low power level L1, a medium power level L2 and a high power level L3. Certainly, the transmission powers may be categorized in other number of levels rather than three.

Starting at Step 200, during the initial period (say 10 millisecond for instance) in the unit time interval (say 1 second), the terminal A repeatedly transmits a detecting packet to the terminal B by sequentially using one of a variety of transmission power levels (L1, L2, L3), until the terminal B generates a CTS packet for responding to the terminal A. In other words, the terminal A firstly transmits an RTS packet of a control information comprising a destination address (which indicating the terminal B) to the terminal B, using a low power level L1 via the communication protocol. Due to natural signal power decay when transmitted in the communication channel, the detecting packet from the terminal A will have a channel-decayed power level M1 when it reaches the terminal B.

Then at Step 210, the terminal B receives the RTS packet transmitted with the low power level L1 from the terminal A, estimates the channel-decayed receiving power M1, and compares the channel-decayed receiving power M1 with a predetermined receiving power threshold M to determine whether to generate a CTS packet from the terminal B for responding to the terminal A. If the value of M1 is not larger than that of M, the terminal B will choose not to generate the CTS packet for responding to the terminal A. However, if the terminal B fails to receive the RTS packet originally the low power level L1, it will not generate the CTS packet either.

After outputting the RTS packet, the terminal A waits for a predetermined time period to receive the responding packet from the terminal B. If no CTS packet from the terminal B is received during the predetermined time period, the terminal A will return to the Step 200 and transmits the RTS packet to the terminal B, using a medium power level L2 via the communication protocol. Then again, at the Step 210, the terminal B receives the RTS packet transmitted with the medium power level L2 from the terminal A, estimates a channel-decayed receiving power M2, and compares the channel-decayed receiving power M2 with the predetermined receiving power threshold M to determine whether to generate the CTS packet from the terminal B for responding to the terminal A.

Likewise, if the value of M2 is not larger than that of M, the terminal B will choose not to generate the CTS packet for responding to the terminal A. If the terminal B fails to receive the RTS packet originally with the low power level L2, it will not generate the CTS packet either. After outputting the RTS packet with the medium power level L2, the terminal A waits for the predetermined time period to receive the responding packet from the terminal B. If no CTS packet from the terminal B is received during the predetermined time period, the terminal A will again return to the Step 200 and transmits the RTS packet to the terminal B, using a high power level L3 via the communication protocol. Then once again, at the Step 210, the terminal B receives the RTS packet originally transmitted with the high power level L3 from the terminal A, estimates a channel-decayed receiving power M3, and compares the channel-decayed receiving power M3 with the predetermined receiving power threshold M to determine whether to generate the CTS packet from the terminal B for responding to the terminal A.

If the value of M3 is larger than that of M, the terminal B will generate a first CTS packet for responding to the terminal A. The first CTS packet is transmitted from the terminal B to the terminal A via the communication protocol. It is to be noted that the present invention takes advantages of the IEEE 802.11 for the transmissions of RTS and CTS to ensure the safety transmission of the data packets.

The terminal A transmits a null data packet to the terminal B via the communication protocol, after receiving the CTS packet from the terminal B. Then, the terminal B responds an acknowledge packet Ack to the terminal A. Under such a condition, the terminal A starts over the process and repeatedly transmits the detecting packet RTS to the terminal B sequentially using the variety of transmission powers, preferably from low to high, or from L1 to L3, via the communication protocol.

In one embodiment, the predetermined receiving power threshold M at the terminal B remains a constant. In another embodiment, the value of the threshold M may be dynamically modified along with the multiple transmission power levels at the terminal A and the distance between the two terminals.

In the example set forth above, only the value of M3 is larger than that of the threshold M, and therefore the terminal B outputs the first CTS packet after having received the RTS packet originally transmitted with the high power level L3. As a result, referring to FIG. 1a, the terminal A transmits three RTS packets sequentially with three different power levels following the order L1, L2 and L3, which indicates from low to high. Since the terminal A receives the first CTS packet after outputting the RTS packet with the high power level L3, the first CTS packet corresponds to that specific transmission power level.

The threshold M is considered as a minimum power level of the signal, which is receivable by the terminal B. Notably, the values of the channel-decayed power levels, M1 or M2, may not necessary equal or less than the threshold M. For example, if the value of M2, which refers to the channel-decayed power level of the RTS packet transmitted from the terminal A with the medium power level L2, is larger than that of the threshold M, the terminal B responds a CTS packet to the terminal A. Under this particular condition, referring to FIG. 1a, the terminal A receives the CTS (the second CTS) packet during the mentioned predetermined time period after outputting the RTS packet with the medium power level L2. Accordingly, the terminal A will not return to the Step 200 to transmit the RTS packet with the high power level L3. The terminal A outputs the null data to the terminal B via the communication protocol instead. Likewise, if the value of M1, which refers to the channel-decayed power level of the RTS packet transmitted from the terminal A with the low power level L1, is larger than that of the threshold M, the terminal B responds a CTS packet to the terminal A, and the terminal A receives the CTS (the third CTS in FIG. 1a) packet during the mentioned predetermined time period after outputting the RTS packet with the medium power level L1 and outputs the null data to the terminal B afterwards. Once again, the terminal A start over the Step 200 to repeatedly transmits the detecting packet RTS to the terminal B using one of the variety of transmission power levels, preferably following the sequence from lower to higher, until the end of the initial period.

Please refer to FIG. 2a again. For each time the responding CTS packet is transmitted from the terminal B to the terminal A, such an event is recorded. After the initial period (10 ms), the process moves to Step 220, which is counting the number of the responding packet CTS to obtain a statistical value, for each of the CTS packet received right after transmitting the RTS packet using one of the variety of transmission powers. An example of the result of the Step 220 is shown in Table 1.

TABLE 1 the number of times receiving the CTS packet corresponding to one of the variety of transmission powers

| With the low power level L1 (L2 & L3 may also successful) | With the medium power level L2 (L3 may also successful) | With the high power level L3 |
|---|---|---|
| 3 times | 11 times | 6 times |

Now processing Step 230, the statistical value is analyzed to determine what kind of transmission power level to be used for transmitting at least a data packet from the terminal A to the terminal B in the unit time interval after the initial period.

There are many methods for analyzing the statistical value. For instance, one method is to compare the number of times corresponding to the transmission power level. If the method is adopted, the medium power level L2 will be selected according to Table 1. Another method is to calculate for the ratio of the number of successful receiving CTS packet corresponding to a certain transmission power level to the total number of received CTS packets, and determine the transmission level to be used based on whether the ratio is larger than a threshold (say 75% for example). According to Table 1, the ratios for L1, L2 and L3 equal to 3/20, (3+11)/20 and (3+12+6)/20, respectively. As a result, since the ratio for L2 is 70%, which is less than 75%, the high power level L3 is selected as the appropriate transmission power.

Figure 2A:
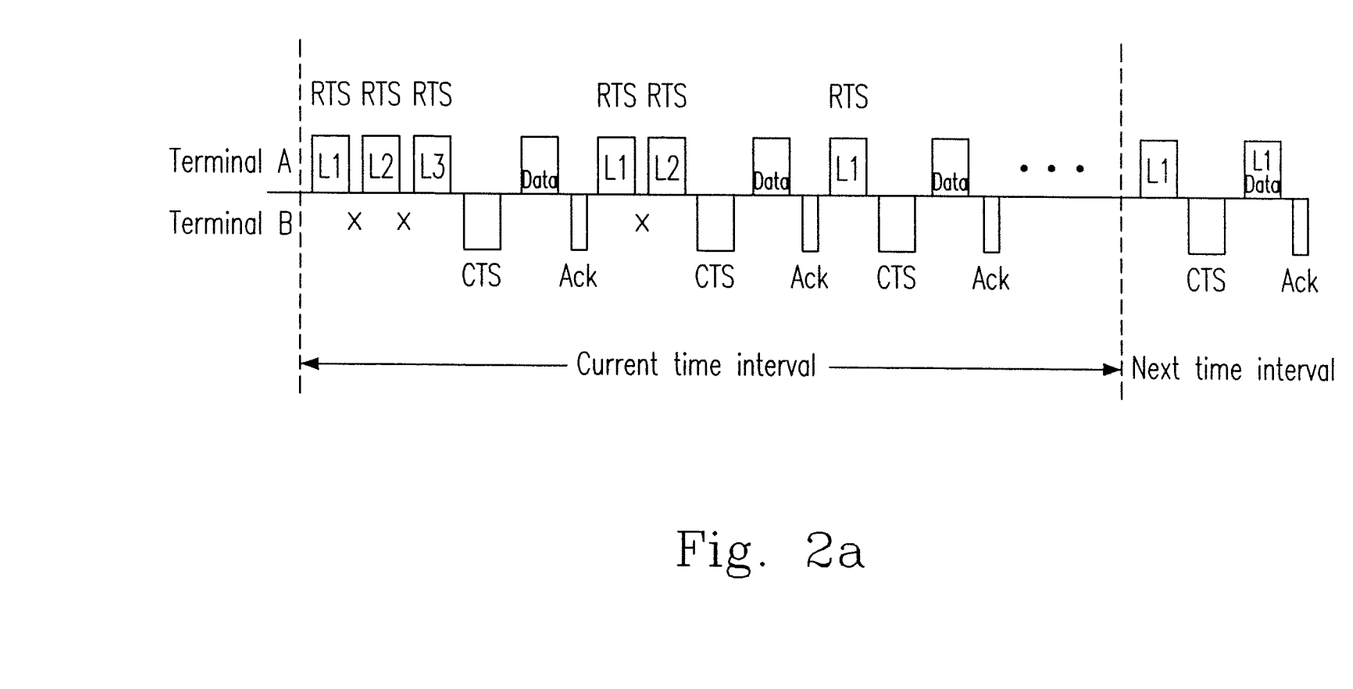
FIG. 2a is a schematic diagram of the signals transmitted between the two terminal for the second and the third preferred embodiments according to the present invention.
Figure 2B:
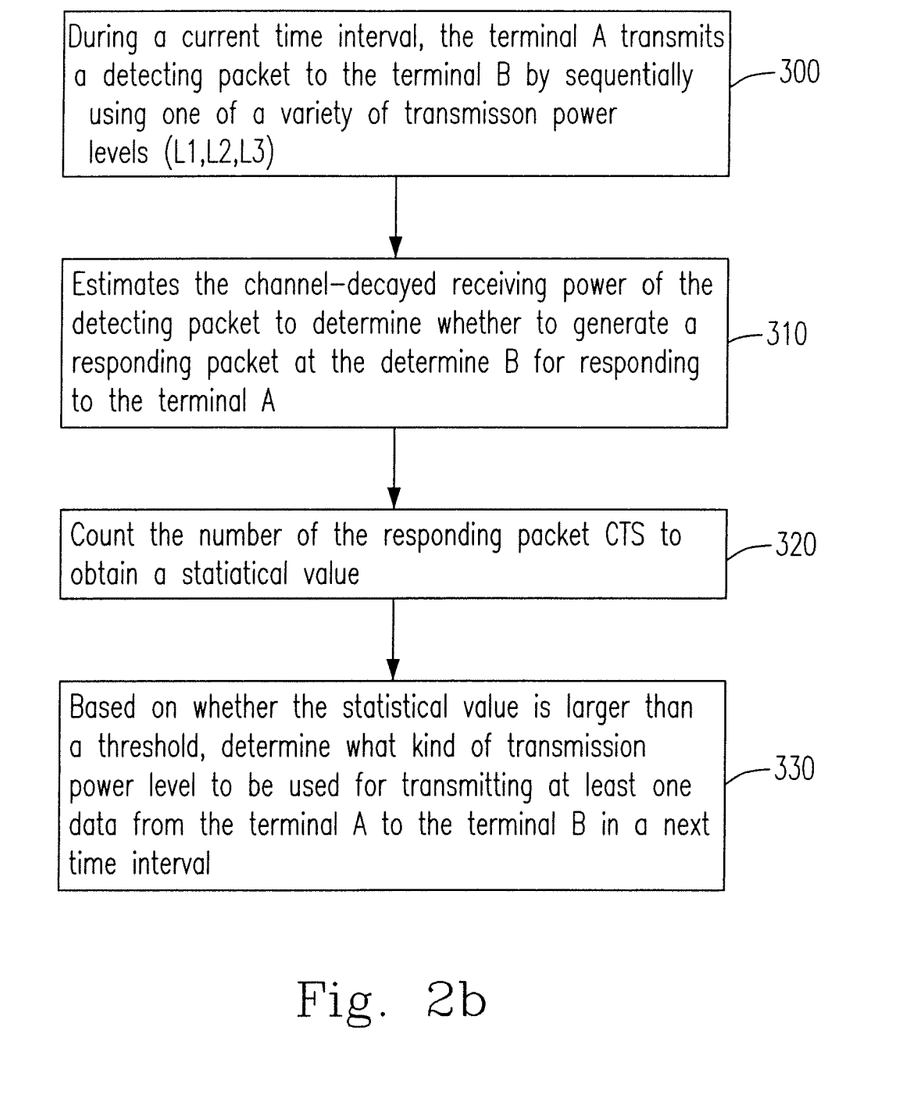
FIG. 2b is a flow chart of the third preferred embodiment according to the present invention.

Please refer to FIGS. 2a and 2b, which are a schematic diagram showing the signals transmitted between the two terminals and a flow chart of a second preferred embodiment of the present invention, respectively. FIG. 2a illustrates a terminal A and a terminal B in remote distance performing the adjustment of transmission power by a RTS/CTS mechanism via a wireless network protocol, such as IEEE802.11. Initially, in Step 300, the terminal A transmits a detecting packet, which is an RTS packet, to the terminal B by sequentially using a variety of transmission power levels during a current time interval. Preferably, the transmission follows a sequence from lower to higher power levels. In other words, the terminal A firstly outputs the RTS packet using a low power level L1 via the communication protocol. Likewise, the detecting packet from the terminal A will have a channel-decayed power level M1 when it reaches the terminal B. (M1=L1−P, where P is the power reduction due to the decay during the channel transmission)

Then at Step 310, the terminal B receives the RTS packet transmitted with the low power level L1 from the terminal A, estimates the channel-decayed receiving power M1, and compares the channel-decayed receiving power M1 with a predetermined receiving power threshold M to determine whether to generate a CTS packet from the terminal B for responding to the terminal A. If the value of M1 is not larger than that of M, the terminal B will choose not to generate the CTS packet for responding to the terminal A. However, if the terminal B fails to receive the RTS packet originally the low power level L1, it will not generate the CTS packet either.

After outputting the RTS packet, the terminal A waits for a predetermined time period to receive the responding packet from the terminal B. If no CTS packet from the terminal B is received during the predetermined time period, the terminal A will return to the Step 300 and transmits the RTS packet to the terminal B, using a medium power level L2 via the communication protocol. Then again, at the Step 310, the terminal B receives the RTS packet transmitted with the medium power level L2 from the terminal A, estimates a channel-decayed receiving power M2, and compares the channel-decayed receiving power M2 with the predetermined receiving power threshold M to determine whether to generate the CTS packet from the terminal B for responding to the terminal A.

Likewise, if the value of M2 is not larger than that of M, the terminal B will choose not to generate the CTS packet for responding to the terminal A. If the terminal B fails to receive the RTS packet originally with the low power level L2, it will not generate the CTS packet either. After outputting the RTS packet with the medium power level L2, the terminal A waits for the predetermined time period to receive the responding packet from the terminal B. If no CTS packet from the terminal B is received during the predetermined time period, the terminal A will again return to the Step 300 and transmits the RTS packet to the terminal B, using a high power level L3 via the communication protocol. Then once again, at the Step 310, the terminal B receives the RTS packet originally transmitted with the high power level L3 from the terminal A, estimates a channel-decayed receiving power M3, and compares the channel-decayed receiving power M3 with the predetermined receiving power threshold M to determine whether to generate the CTS packet from the terminal B for responding to the terminal A.

If the value of M3 is larger than that of M, the terminal B will generate a first CTS packet for responding to the terminal A. The first CTS packet is transmitted from the terminal B to the terminal A via the communication protocol.

The terminal A transmits a data packet to the terminal B via the communication protocol, after receiving the CTS packet from the terminal B. After receiving the data packet, the terminal B responds an acknowledge packet Ack to the terminal A. Under such a condition, the terminal A starts over the process and repeatedly transmits the detecting packet RTS to the terminal B sequentially using the variety of transmission powers, preferably from low to high, or from L1 to L3, via the communication protocol.

All the other details regarding the process of the second embodiment are similar to that of the first embodiment, so there is no need to repeat.

In a third embodiment of the present invention, the concept of the first embodiment is incorporated with that of the second embodiment to determine the transmission powers for the next time interval. For each time the responding CTS packet is transmitted from the terminal B to the terminal A, such an event is recorded. After the end of a current time interval (say 1 second), the process moves to Step 320, which is counting the number of the responding packet CTS to obtain a statistical value, for each of the CTS packet received right after transmitting the RTS packet using one of the variety of transmission powers. An example of the result of the Step 320 is shown in Table 2.

TABLE 2 the number of times receiving the CTS packet corresponding to one of the variety of transmission powers

| With the low power level L1 | With the medium power level L2 | With the high power level L3 |
|---|---|---|
| 50 times | 1000 times | 1500 times |

At Step 330, the statistical value is compared with a threshold to determine a plural transmission power levels to be used during a next time interval. For example, at the end of the current time interval, the statistical data in Table 2 may be used for analysis. As a result, the power level which is used for less than a certain number of times will not be available for the terminal A to use for transmitting the RTS packet. According to the data in Table 2, the number of times that the low power level L1 is used is much lower than that of the other power levels, so the L1 may not be available for the next time interval.

Figure 3A:
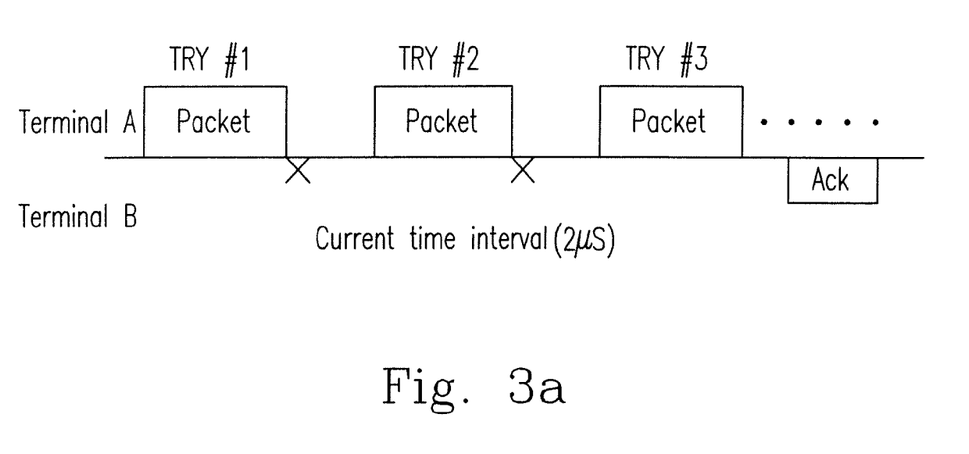
FIG. 3a is a schematic diagram showing the signals transmitted between the two terminals according to the fourth preferred embodiment of the present invention.
Figure 3B:
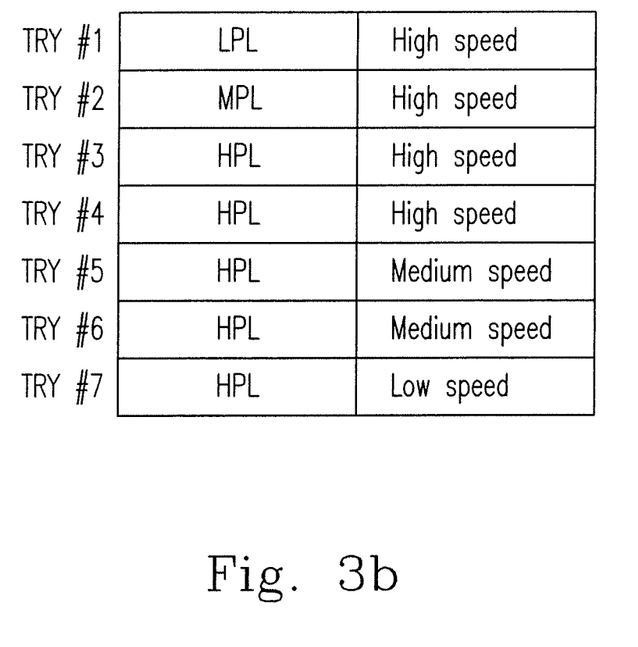
FIG. 3b is a table containing the plural groups of transmission information according to a preferred embodiment of the present invention.

Please refer to FIG. 3a, which is a schematic diagram showing the signals transmitted between a terminal A and a terminal B according to a fourth preferred embodiment of the present invention. According to FIG. 3a, the terminal A transmits a data packet to the terminal B based on a table containing plural groups of transmission information (as shown in FIG. 3b). Based on a specific transmission information, the terminal B determines whether to response a responding packet (for example, an acknowledge packet) to the terminal A. The responding packet is used as the criterion for the terminal A to choose appropriate transmission power level and transmission speed for transmitting the data packet to the terminal B.

In a WLAN environment, the terminals A and B perform information transmission via a communication protocol in compliance with the requirements of IEEE 802.11. Those transmission speed levels in the table comply with the requirements of IEEE802.11, IEEE802.11a, IEEE802.11b, IEEE802.11g, IEEE802.11i or IEEE802.11n, while the transmission information in the table is adjusted based on the auto-rate fall back.

Figure 3C:
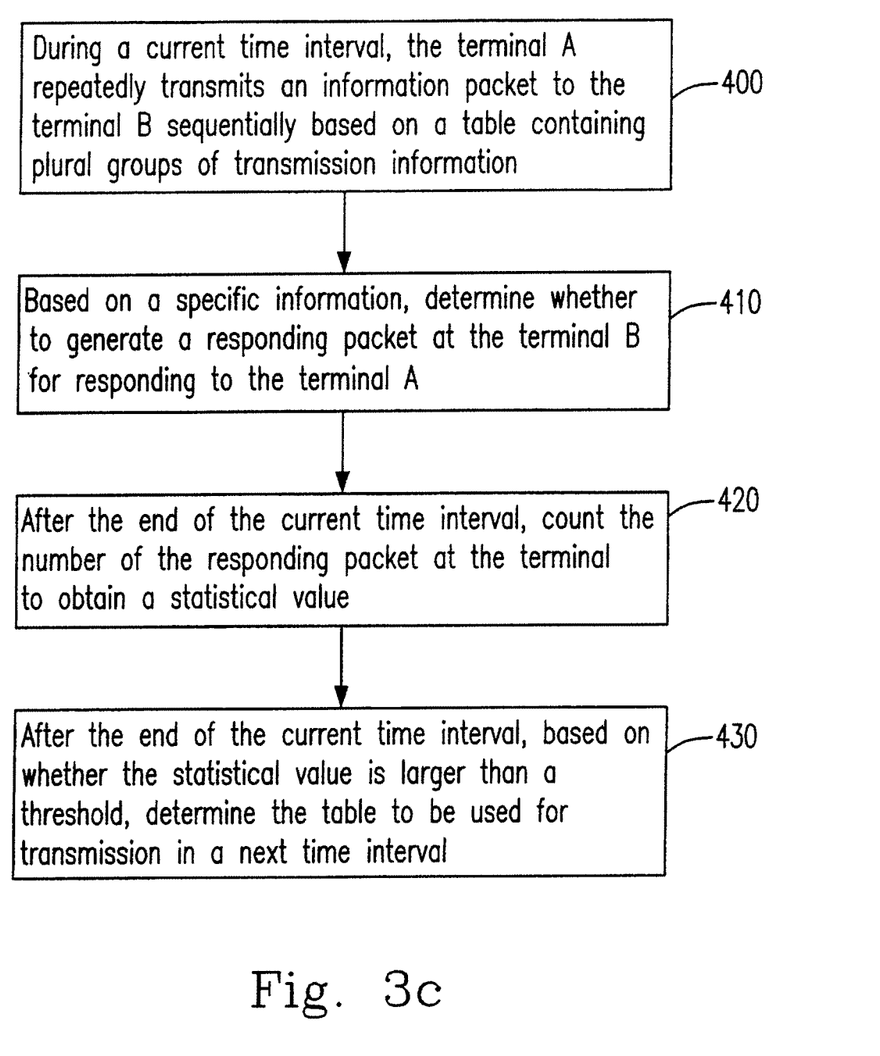
FIG. 3c is a flow chart according to the fourth preferred embodiment of the present invention.

Please refer to FIG. 3b incorporated with FIG. 3c, which is a flow chart according to the fourth preferred embodiment of the present invention. At Step 400, the terminal A repeatedly transmits an information packet to the terminal B sequentially based on a table (such as shown in FIG. 3b) containing plural groups of transmission information during a current time interval (2 microseconds). Each of plural groups of transmission information includes a transmission power and a transmission speed. According to the table as shown in FIG. 3b, the terminal A transmits the information packet to the terminal B via the communication protocol, using a high transmission speed and a low transmission power level indexed as TRY#1 in the table.

At Step 410, a specific transmission information is assessed to determine whether to generate a responding packet Ack form the terminal B for responding to the terminal A. The terminal A will transmit a data packet to the terminal B using a high transmission speed and a medium transmission power level indexed as TRY#2 in the table, if the terminal A has not received the responding packet from the terminal B after a predetermined time period. Again, after receiving the data packet in accordance with the power level and the transmission speed of TRY#2 in the table, the terminal B determines whether to generate the responding packet Ack for acknowledging the terminal A, based on the result of the assessment to the received data packet. If the terminal A fails to receive the responding packet Ack, the similar process will be repeated until the terminal A receives the responding packet Ack. According to the example shown in FIG. 3a, more than three information packets, in accordance with TRY1, TRY2 and TRY 3 respectively, have been outputted from the terminal A before the terminal B responds the responding packet Ack to the terminal A.

Notably, the value of the threshold of the specific transmission information at the terminal B may be either constant or dynamically changed along with the distance between the two terminals. When the terminal A receives the responding packet Ack, the terminal A restarts the process from the Step 400 to the Step 410 until the end of the current time interval.

At Step 420, after the end of the current time interval, the total number of the responding packet Ack during the current time interval (2 microseconds) is counted to obtain a statistical value.

At Step 430, after the end of the current time interval, the statistical value is analyzed to update the table of transmission information for a next time interval. For example, the updating may be temporarily removing some of the TRYs. In one embodiment, the statistical value corresponding to each of the TRY#N is compared with a threshold value, to determine the other table of transmission information to be utilized during a next time interval. If the statistical value corresponding to one of the group composed of TRY#1, TRY#2, ... and TRY#7 is less than a threshold, the transmission information indexed with that particular TRY#N (where N is a number selected from 1 to 7) will not be listed in the table for the next time interval. Besides, the statistical data regarding each of the transmission power levels and the transmission speed can be also identified. For example, if the total number of times for the high transmission speed is lower than a certain level, the TRY#1 to TRY#4, which refers to the high transmission speed, may not be used during the next time interval. In such an embodiment, the terminal A is under transmission training during the current time interval. However, the transmission training may be performed during an initial period in a unit time interval. Further, in a WLAN environment, an appropriate transmission speed needed for transmitting a data packet from the terminal A to the terminal B can be obtained by following Steps 200 to 230 illustrated in FIG. 1*b* and Steps 300 to 330 in FIG. 2*b*.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims that are to be accorded with the broadest interpretation so as to encompass all such modifications and similar structures.

What is claimed is:

1. A method for adjusting transmission power of a communication system having a first terminal and a second terminal, the method comprising steps of:
   repeatedly transmitting a detecting packet from the first terminal to the second terminal by sequentially using one of a variety of transmission powers based on a table containing plural groups of transmission information, each group of which comprises a transmission power and a transmission rate;
   receiving a responding packet from the second terminal, wherein the responding packet corresponds to the one of the variety of transmission powers;
   choosing at least one from the variety of the transmission powers for transmitting at least a data packet to the second terminal therewith based on the responding packet from the second terminal;
   obtaining a statistical value based on the responding packet from the second terminal and analyzing the statistical value to update the table, wherein the first terminal performs a message transmission to the second terminal via a protocol complying with an IEEE 802.11 standard; and
   updating the table based on the responding packet from the second terminal, wherein the updating comprises omitting at least one of the groups from the table for a next time interval.

2. The method of claim 1, wherein the responding packet is generated from the second terminal when a channel-decayed receiving power of the detecting packet is larger than a predetermined receiving power threshold.

3. The method of claim 1, wherein the detecting packet is a request-to-send packet, and the responding packet is a clear-to-send packet.

4. The method of claim 1, further comprising a step of transmitting a null data packet from the first terminal after the step of receiving the responding packet from the second terminal.

5. The method of claim 1, further comprising a step of repeating the step of repeatedly transmitting a detecting packet from the first terminal to the second terminal by sequentially using one of a variety of transmission powers after the step of receiving the responding packet from the second terminal.

6. The method of claim 1, being applied to one of a wireless local area network and a wireless global area network.

7. The method of claim 1, wherein each of the detecting packets comprises an address information of the second terminal.

8. The method of claim 1, wherein the step of repeatedly transmitting a detecting packet from the first terminal to the second terminal by sequentially using one of a variety of transmission powers is performed according to a sequence from the lowest power to the highest one.

9. A method for adjusting transmission information of a communication system having a first terminal and a second terminal, the method comprising steps of:
   repeatedly transmitting a detecting packet from the first terminal to the second terminal based on a table containing plural groups of transmission information, each group of which comprises a transmission power and a transmission rate;
   receiving a responding packet from the second terminal, wherein the responding packet corresponds to one of the plural groups of transmission information;
   obtaining a statistical value based on the responding packet from the second terminal and analyzing the statistical value to update the table, wherein the first terminal performs a message transmission to the second terminal via a protocol complying with an IEEE 802.11 standard; and
   updating the table based on the responding packet from the second terminal, wherein the updating comprises omitting at least one of the groups from the table for a next time interval.

10. The method of claim 9, wherein the responding packet is an acknowledgement packet.

11. The method of claim 9, further comprising a step of adjusting the transmission information in the table based on an auto-rate fallback mechanism.

12. A method for adjusting transmission power of a communication system having a first terminal and a second terminal, the method comprising steps of:
   repeatedly transmitting a detecting packet from the first terminal to the second terminal by sequentially using one of a variety of transmission powers in a current time interval based on a table containing plural groups of transmission information, each group of which comprises a transmission power and a transmission rate;
   receiving a responding packet from the second terminal, wherein the responding packet corresponds to the one of the variety of transmission powers; choosing at least one from any one of the variety of the transmission powers for a transmission between the first and the second terminals in a next time interval based on the responding packet from the second terminal;
   obtaining a statistical value based on the responding packet from the second terminal and analyzing the statistical value to update the table, wherein the first terminal performs a message transmission to the second terminal via a protocol complying with an IEEE 802.11 standard; and
   updating the table based on the responding packet from the second terminal, wherein the updating comprises omitting at least one of the groups from the table for the next time interval.

13. The method of claim 12, wherein the detecting packet is a request-to-send packet comprising an address information of the second terminal, and the responding packet is a clear-to-send packet.

14. The method of claim 12, further comprising a step of transmitting a data packet from the first terminal when the second terminal generates the responding packet in response to the first terminal.

15. The method of claim 12, further comprising a step of obtaining a statistical value based on the responding packet from the second terminal, wherein the choosing at least one from the variety of transmission powers is based on the statistical value.

16. The method of claim 12, wherein the step of repeatedly transmitting a detecting packet from the first terminal to the second terminal by sequentially using one of a variety of transmission powers is performed according to a sequence from the lowest one to the highest one.

* * * * *